United States Patent
Liu et al.

(10) Patent No.: US 11,663,294 B2
(45) Date of Patent: May 30, 2023

(54) SYSTEM AND METHOD FOR TRAINING A MODEL USING LOCALIZED TEXTUAL SUPERVISION

(71) Applicant: Toyota Research Institute, Inc., Los Altos, CA (US)

(72) Inventors: Zhijian Liu, Cambridge, MA (US); Simon A. I. Stent, Cambridge, MA (US); John H. Gideon, Howell, MI (US); Jie Li, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 204 days.

(21) Appl. No.: 17/323,656

(22) Filed: May 18, 2021

(65) Prior Publication Data

US 2022/0300764 A1    Sep. 22, 2022

Related U.S. Application Data

(60) Provisional application No. 63/161,686, filed on Mar. 16, 2021.

(51) Int. Cl.
*G06K 9/62* (2022.01)
*G06K 9/32* (2006.01)
(Continued)

(52) U.S. Cl.
CPC ........ *G06F 18/2148* (2023.01); *G06F 18/213* (2023.01); *G06F 18/2185* (2023.01);
(Continued)

(58) Field of Classification Search
CPC ............. G06F 18/2148; G06F 18/2185; G06F 18/213; G06V 30/153; G06V 20/635; G06N 3/045
See application file for complete search history.

(56) References Cited

U.S. PATENT DOCUMENTS

2020/0097604 A1* 3/2020 Lee .................. G06V 20/70
2022/0036127 A1* 2/2022 Lin .................. G06T 11/00

OTHER PUBLICATIONS

Changpinyo et al. "Telling the What while Pointing the Where: Fine-grained Mouse Trace and Language Supervision for Improved Image Retrieval." Mar. 30, 2021, pp. 1-14, arXiv:2102.04980v2 [cs.CV] Mar. 30, 2021.

(Continued)

*Primary Examiner* — David F Dunphy
(74) *Attorney, Agent, or Firm* — Christopher G. Darrow; Darrow Mustafa PC

(57) ABSTRACT

Systems and methods for training a model are described herein. In one example, a system for training the model includes a processor and a memory in communication with the processor having a training module. The training module has instructions that cause the processor to determine a contrastive loss using a self-supervised contrastive loss function, adjust, based on the contrastive loss, model weights a visual backbone that generated feature maps and/or a textual backbone that generated feature vectors. The training module also has instructions that cause the processor to determine a localized loss using a supervised loss function that compares an image-caption attention map with visual identifiers and adjust, based on the localized loss, the model weights the visual backbone and/or the textual backbone.

20 Claims, 7 Drawing Sheets

(51) Int. Cl.
| | |
|---|---|
| G06K 9/34 | (2006.01) |
| G06N 3/04 | (2023.01) |
| G06F 18/214 | (2023.01) |
| G06V 20/62 | (2022.01) |
| G06V 30/148 | (2022.01) |
| G06F 18/213 | (2023.01) |
| G06F 18/21 | (2023.01) |
| G06N 3/045 | (2023.01) |

(52) U.S. Cl.
CPC ........... G06N 3/045 (2023.01); G06V 20/635 (2022.01); G06V 30/153 (2022.01)

(56) References Cited

OTHER PUBLICATIONS

Ling et al. "Fast interactive object annotation with curve-gcn." Proceedings of the IEEE/CVF Conference on Computer Vision and Pattern Recognition. 2019, pp. 5257-5266.

Acuna et al. "Efficient interactive annotation of segmentation datasets with polygon-rnn++." Proceedings of the IEEE Conference on Computer Vision and Pattern Recognition. 2018, pp. 859-868.

Desai et al. "Virtex: Learning visual representations from textual annotations." Mar. 2, 2021, pp. 1-17 arXiv:2006.06666v2 [cs CV] Mar. 2, 2021.

Koh et al. "Text-to-Image Generation Grounded by Fine-Grained User Attention" 2021, pp. 237-246, CVF.

Radford et al. "Learning Transferable Visual Models From Natural Language Supervision" arXiv:2103.00020v1 [cs.CV] Feb. 26, 2021, pp. 1-48.

Pont-Tuset et al. "Connecting Vision and Language with Localized Narratives" Jul. 20, 2020, pp. 1-24, arXiv:1912.03098v4 [cs.CV] Jul. 20, 2020.

Deng et al. "ImageNet: a Large-Scale Hierarchical Image Database" In CVPR, 2009, pp. 1-8.

Joulin et al. "Learning Visual Features from Large Weakly Supervised Data" In ECCV, 2016, pp. 1-11, arXiv:1511.02251v1 [cs.CV] Nov. 6, 2015.

He et al. "Momentum Contrast for Unsupervised Visual Representation Learning" CVPR 2020 paper, pp. 9729-9738, final published version of the proceeding is available on IEEE Xplore.

* cited by examiner

SYSTEM AND METHOD FOR TRAINING A MODEL USING LOCALIZED TEXTUAL SUPERVISION

CROSS-REFERENCE TO RELATED APPLICATION

This application claims the benefit of U.S. Provisional Patent Application No. 63/161,686, entitled "LocTex: Learning Data-Efficient Visual Representations from Localized Textual Supervision," filed Mar. 16, 2021, which is incorporated by reference herein in its entirety.

TECHNICAL FIELD

The subject matter described herein relates, in general, to systems and methods for training a model and, more particularly, systems and methods for pre-training a model used in computer vision tasks.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Neural networks, such as convolutional neural networks (CNNs), have been utilized to perform computer vision tasks such as object detection and semantic/instance segmentation. These neural networks first need to be trained to complete computer vision tasks successfully. The training of these neural networks may involve pre-training plus fine-tuning the neural networks to reduce the need for costly annotations. Moreover, in one example, a CNN backbone may first be pre-trained to perform a particular task. Then, the learned features can be transferred to other downstream tasks by fine-tuning the neural network using a target data set.

However, pre-training still requires annotated training data, which may be very expensive to acquire, and pre-training on a classification task may not be effective for tests that are more sensitive to localization than classification. Efforts to solve these issues have involved pre-training the neural networks with coarse, freely available labels, such as metadata and hashtags, or self-supervised pre-training that learns visual representations from unlabeled images. However, these solutions also have drawbacks. For example, pre-training with coarse labels is still not effective for those tasks that are more sensitive to localization than classification. As to self-supervised pre-training, these methods require prohibitively long schedules to exploit their potential.

SUMMARY

This section generally summarizes the disclosure and is not a comprehensive explanation of its full scope or all its features.

In one embodiment, a system for training a model includes a processor and a memory in communication with the processor having a training module. The training module includes instructions that, when executed by the processor, cause the processor to determine a contrastive loss using a self-supervised contrastive loss function based on feature maps describing a visual content of an image having objects and feature vectors describing a meaning of words of a caption describing the objects within the image. Thereafter, based on the contrastive loss, the training module may cause the processor to adjust model weights of a visual backbone that generated the feature maps and/or a textual backbone that generated the feature vectors.

The training module further includes instructions that, when executed by the processor, cause the processor to determine a localized loss using a supervised loss function that compares an image-caption attention map with visual identifiers and adjust, based on the localized loss, the model weights of the visual backbone and/or the textual backbone. The visual identifiers identify locations of the objects within the image and are associated with portions of the caption describing the objects and may be in the form of mouse traces.

In another embodiment, a method for training a model includes the step of determining a contrastive loss using a self-supervised contrastive loss function based on feature maps describing a visual content of an image having objects and feature vectors describing a meaning of words of a caption describing the objects within the image. The method then adjusts, based on the contrastive loss, model weights of a visual backbone that generated the feature maps and/or a textual backbone that generated the feature vectors.

The method further includes the steps of determining a localized loss using a supervised loss function that compares an image-caption attention map with visual identifiers and adjusting, based on the localized loss, the model weights of the visual backbone and/or the textual backbone. Like before, the visual identifiers identify locations of the objects within the image and are associated with portions of the caption describing the objects and may be in the form of mouse traces.

In yet another embodiment, a non-transitory computer-readable medium has instructions that, when executed by a processor, cause the processor to determine a contrastive loss using a self-supervised contrastive loss function based on feature maps describing a visual content of an image having objects and feature vectors describing a meaning of words of a caption describing the objects within the image. Thereafter, based on the contrastive loss, cause the processor to adjust model weights of a visual backbone that generated the feature maps and/or a textual backbone that generated the feature vectors.

The non-transitory computer-readable medium further includes instructions that, when executed by a processor, cause the processor to determine a localized loss using a supervised loss function that compares an image-caption attention map with visual identifiers and adjust, based on the localized loss, the model weights of the visual backbone and/or the textual backbone. Again, the visual identifiers identify locations of the objects within the image and are associated with portions of the caption describing the objects and may be in the form of mouse traces.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for training and/or pre-training a model for a neural network, such as a CNN. As stated in the background section, the training and/or pre-training of a model generally requires the use of annotated data sets for supervised training or unannotated data sets for self-supervised training. Annotated data sets are difficult and expensive to develop, while the use of unannotated data sets generally requires significant computational resources.

The system and method described in this specification utilize a contrastive pre-training framework for training a model between images and related captions. In addition, the system and method utilize a supervised training methodology wherein a cross-modal attention map with rendered mouse traces is utilized to provide coarse localization signals to perform supervised training. As such, the system and method train the model in an unsupervised fashion using images and related captions and in a supervised fashion using mouse traces related to the image that provide coarse localization signals. The two losses from the supervised and unsupervised training may be jointly utilized to optimize model weights. This form of annotation can be easily acquired from non-expert workers, leading to lower cost and better scalability.

Figure 1:
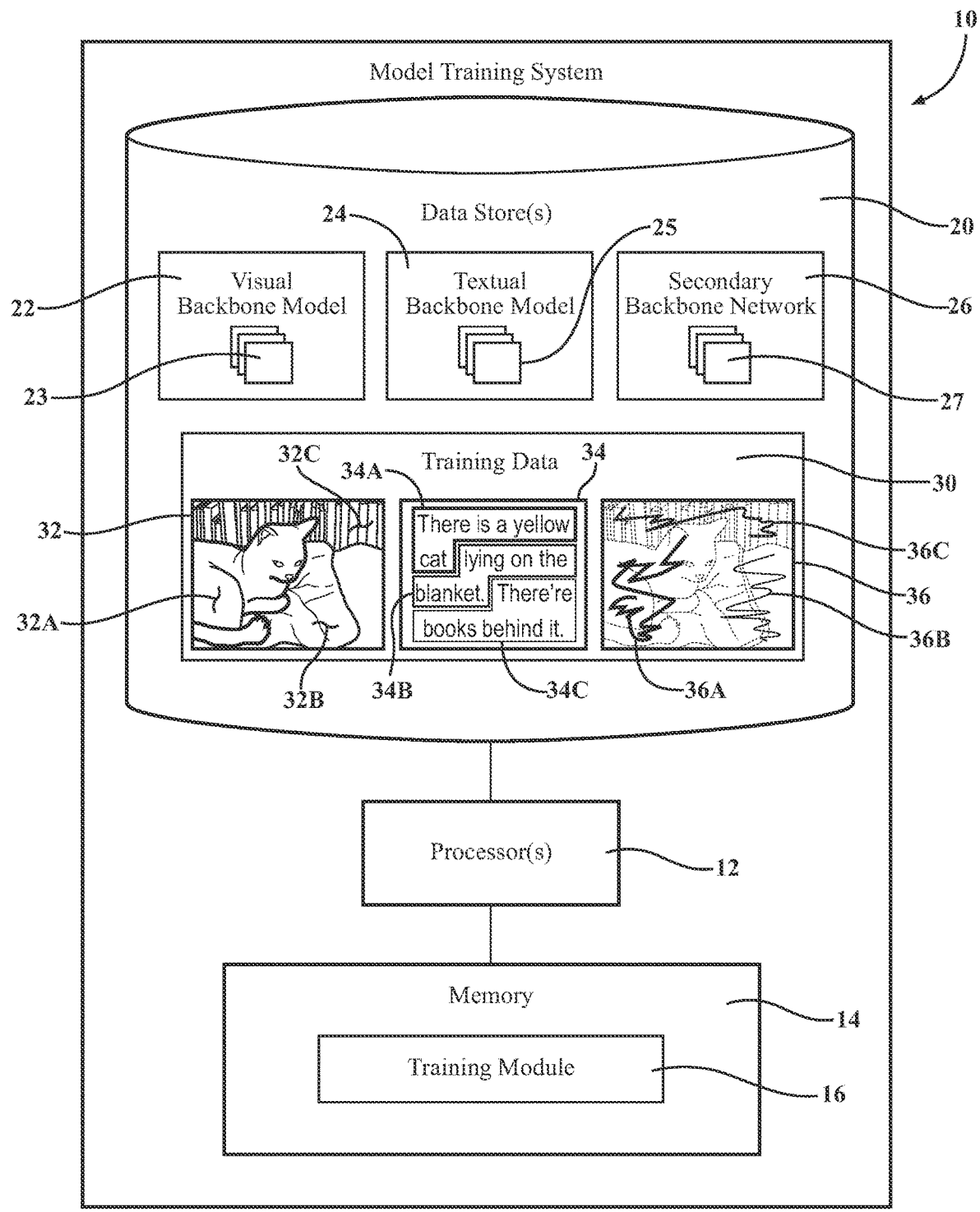
FIG. 1 illustrates a system for training a model, such as a visual backbone model and/or a textual backbone model.

Referring to FIG. 1, illustrated is a model training system 10 for training a model. The training of the model may be the actual training of the model or may be pre-training the model, wherein pre-training refers to training a model with one task to help it form parameters that can be used in other tasks.

As shown, the model training system 10 includes one or more processor(s) 12. The processor(s) 12 may be a single processor or may be multiple processors working in concert. Accordingly, the processor(s) 12 may be a part of the model training system 10, or the model training system 10 may access the processor(s) 12 through a data bus or another communication path. In one or more embodiments, the processor(s) 12 may be an application-specific integrated circuit that is configured to implement functions associated with a training module 16. In general, the processor(s) 12 is an electronic processor such as a microprocessor that is capable of performing various functions as described herein.

In one embodiment, the model training system 10 includes a memory 14 that stores the training module 16. The memory 14 is a random-access memory (RAM), read-only memory (ROM), a hard disk drive, a flash memory, or other suitable memory for storing the training module 16. The training module 16 is, for example, computer-readable instructions that, when executed by the processor(s) 12, cause the processor(s) 12 to perform the various functions disclosed herein.

Furthermore, in one embodiment, the model training system 10 includes one or more data store(s) 20. The data store(s) 20 is, in one embodiment, an electronic data structure such as a database that is stored in the memory 14 or another memory and that is configured with routines that can be executed by the processor(s) 12 for analyzing stored data, providing stored data, organizing stored data, generating stored data, and so on. Thus, in one embodiment, the data store(s) 20 stores data used by the training module 16 in executing various functions. In one embodiment, data store(s) 20 includes three different models. These models may include a visual backbone model 22, a textual backbone model 24, and a secondary neural network 26. The visual backbone model 22, the textual backbone model 24, and the secondary neural network 26 may be neural networks of varying types and may include model weights 23, 25, and 27, respectively. The model weights 23, 25, and/or 27 may be the parameters, including trainable and non-trainable, of the model used in the layers of the model. The adjusting of the model weights 23, 25, and 27 impacts the performance of the visual backbone model 22, the textual backbone model 24, and the secondary neural network 26, respectively.

The visual backbone model 22 may be utilized to perform any one of a number of different computer vision tasks, such as object detection and semantic/instance segmentation. In one example, the visual backbone model 22 may be a component that will be transferred to other downstream vision tasks. Any CNN can be utilized as the visual backbone model 22. In one example, the visual backbone model 22 may be a standard ResNet-50 that may have certain modifications, such as removing the last linear classification layer and a preceding global average pooling layer to keep the spatial dimension. In one example, the visual backbone model 22 may output a feature map having a size of 2048×R×R, where R is the output resolution, which may be $\frac{1}{32}$ of the input resolution. Again, it should be understood that this type of ResNet-50 is only one example of the type of CNN that may be utilized as the visual backbone model 22.

The textual backbone model 24 may be utilized to encode an input caption to a feature vector that captures the meaning of word tokens forming the caption. In one example, the textual backbone model 24 may adopt a Transformer architecture as the textual backbone, implemented with a 4-layer 1024-wide model with 16 self-attention heads. The activation function may be a Gaussian Error Linear Unit (GELU), instead of a Rectified Linear Unit (ReLU), to achieve better empirical performance. Before feeding the caption in, the caption may first be tokenized into a lower-cased byte pair encoding with a vocabulary size of 10K. The input sequence may also be padded with a start of sequence and end of sequence tokens to mark the boundary. The output feature vector from the textual backbone model 24 may have a size of 1024×L, where L is the caption length after tokenization.

The secondary neural network 26 may include a multi-dimensional fully-connected layer to generate transformed feature vectors and transformed feature maps, which may be used to train the visual backbone model 22 and/or the textual backbone model 24.

The data store(s) 20 may also include training data 30 for training the visual backbone model 22, the textual backbone model 24, and/or the secondary neural network 26. The training data 30 generally includes three paired pieces. Moreover, the training data 30 includes an image 32 paired with a caption 34 and visual identifiers 36. In this example, the image 32 is an image having a cat 32A that is lying on a blanket 32B, wherein some books 32C are located in the background behind the cat 32A and the blanket 32B. Of course, it should be understood the image 32 could be an image of a number of different objects arranged in different ways.

The caption 34 includes statements in the form of tokens 34A-34C. The first token 34A states, "there is a yellow cat." The second token 34B states, "lying on the blanket." The third token 34C states, "there're books behind it." Taking the tokens 34A-34C together, the tokens 34A-34C of the caption 34 generally describe what occurs in image 32. Namely, the tokens 34A-34C describe the presence of a yellow cat lying on a blanket with some books behind it. As such, the caption 34 is related to what is occurring within the image 32.

Generally, the caption 34 is a free-form annotation resulting from annotators being asked to describe the content of the image 32 using natural language. The information captured in the caption 34 may be semantically dense: i.e., the objects 32A-32C in the image 32 and their attributes and relative spatial relationships. The underlying rich semantic information could potentially benefit a variety of downstream vision tasks. The cost of this form of annotation is much lower compared with other dense labeling since it is a very natural task for humans to do and does not require the annotator to have extensive training or domain knowledge. The caption 34 may be generated by utilizing a two-stage data collection pipeline. In the first stage, an annotator is asked to describe the image 32 verbally and then apply either speech recognition or manual transcription to generate the caption 34. From this collection protocol, the starting and ending timestamp of the tokens 34A-34C forming the caption 34 can be obtained, which, as will be explained later, can be used to synchronize with the visual identifiers 36.

The visual identifiers 36 may be in the form of one or more mouse traces representing the location of a particular object within an image. For example, the visual identifier 36A coarsely identifies the location of the cat 32A within the image 32. The visual identifier 36B coarsely identifies the location of the blanket 32B within the image 32. Finally, the visual identifier 36C coarsely identifies the location of the books 32C within the image 32.

Compared with drawing a sequence of bounding boxes or instance masks, logging the mouse traces of the subject while describing the image 32 is an easier and more natural way for human annotators to specify the object locations. It can be acquired almost freely in the caption annotation pipeline since the annotators only need to hover their mouse over the region being described. Though the localization and semantic correspondence may be too coarse for these annotations to be directly used for tasks like object detection, it does capture rich information about "what is where" at a high level.

Figure 2:
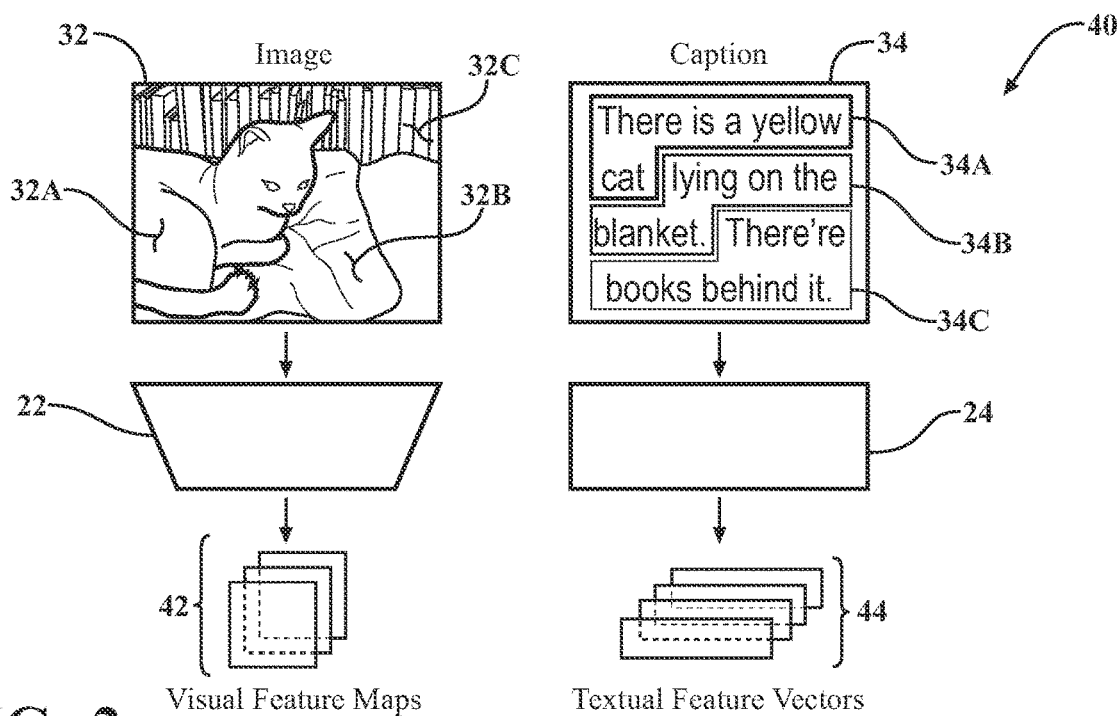
FIG. 2 is a flowchart illustrating the extraction of feature maps and feature vectors from an image and a related caption, respectively, performed by the system for training the model.

The training module 16 generally includes instructions that function to control the processor(s) 12 to train the visual backbone model 22, the textual backbone model 24, and/or the secondary neural network 26. Moreover, referring to FIG. 2, the training module 16 may include instructions that cause the processor(s) 12 to generate feature maps describing the visual content of an image, such as the image 32 having objects 32A-32C. This may occur by first passing the image 32 through the visual backbone model 22 to generate the visual feature maps 42 that generally describe the image 32. As explained previously, the visual backbone model 22 may output a feature map having a size of 2048×R×R, where R is the output resolution, which may be ⅟32 of the input resolution.

The training module 16 may include instructions that cause the processor(s) 12 to generate textual feature vectors 44. This may occur by passing the caption 34 through the textual backbone model 24. As explained previously, the caption 34 includes tokens 34A-34C that describe the objects 32A-32C found within the image 32. The textual backbone model 24 may encode the caption 34 into textual feature vectors 44 that capture the meaning of the tokens 34A-34C. The textual feature vectors 44 from the textual backbone model 24 may have a size of 1024×L, where L is the caption length after tokenization.

Figure 3:
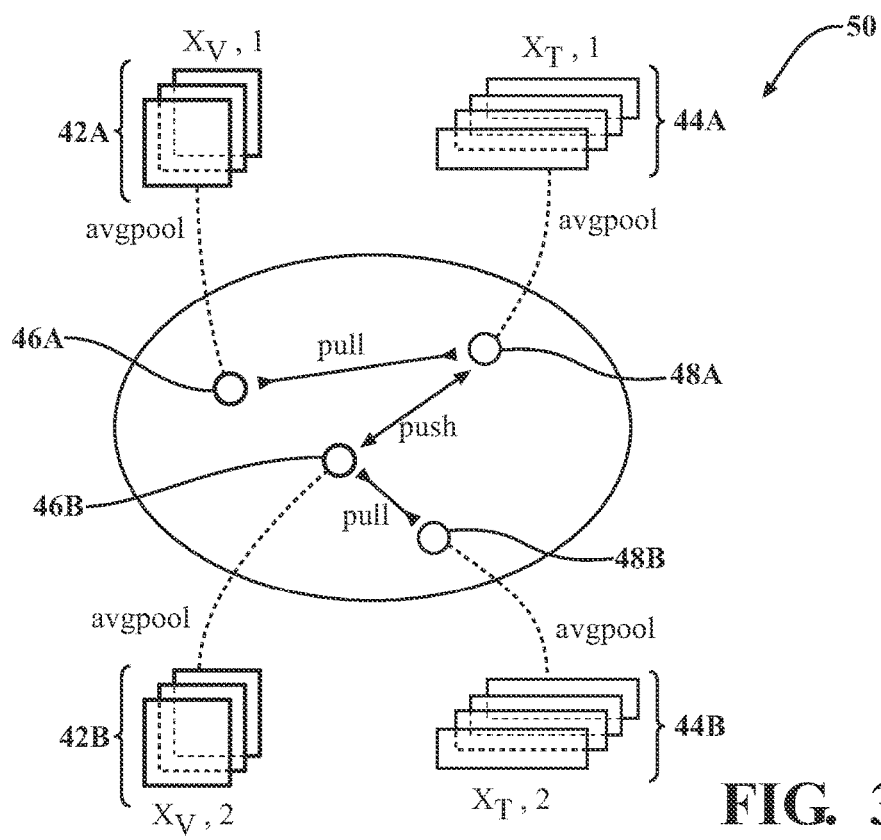
FIG. 3 is a flowchart illustrating the determination of a contrastive loss using a self-supervised contrastive loss function performed by the system for training the model.

Next, the training module 16 may include instructions that cause the processor(s) 12 to determine a contrastive loss using a self-supervised contrastive loss function based on the visual feature maps 42 describing the visual content of the image 32 and the textual feature vectors 44 describing the meaning of words of the caption 34 the objects 32A-32C within the image 32. Referring to FIG. 3 illustrated is a flow chart 50 detailing how the contrastive loss is determined. Given a batch of feature pairs extracted from the visual backbone model 22 and the textual backbone model 24: $\{(x_{v,k}, x_{T,k}) | 1 \leq k \leq n\}$, where n is the batch size, the processor(s) 12 may transform each of the feature maps 42A and 42B and the feature vectors 44A and 44B with a global average pooling and a single 1024-dimension fully-connected layer. The resulting visual features 46A and 46B and textual features 48A and 48B are denoted $y_{v,k}$ and $y_{T,k}$, both having a size of 1024).

The traditional way to guide pre-training by matching $y_{v,k}$ and $y_{T,k}$ in the feature space using a simple regression loss will lead to a collapsed solution where all features are projected to the same location in the feature space. As such, the training module 16 may include instructions that cause the processor(s) 12 to encourage the visual backbone model 22 and the textual backbone model 24 to not only project the visual feature maps 42 and textual feature vectors 44 of matching image-caption pairs to be closer, but also the features of non-matching pairs to be further. More specifically, there are $n^2$ image-caption pairs $\{(y_{v,i}, y_{T,j}) | 1 \leq k \leq n\}$ in total, among which only the n pairs with i=j are positive, as they correspond to the same data while the remaining ($n^2-n$) pairs are negative. As such, the training module 16 causes the processor(s) 12 to pull the positive pairs together and push the negative pairs apart to guide the pre-training.

The contrastive loss function to determine the contrastive loss may be expressed as follows:

$$L_C = -\sum_{i=1}^{n} \log \frac{\exp(sim(y_{V,i}, y_{T,i})/\tau)}{\Sigma_{j \neq i} \exp(sim(y_{V,i}, y_{T,i})/\tau)} \quad (1)$$

where sim(u, v)=$u^T v/\|u\|_2 \|v\|_2$ is the cosine similarity between two vectors, and τ denotes a temperature parameter, which may be set to 0.1.

Once the contrastive loss is determined, the training module 16 may include instructions that cause the processor(s) 12 to adjust, based on the contrastive loss, the model weights 23 and/or 25 of the visual backbone model 22 and/or the textual backbone model 24, respectively. Applying the contrastive loss over the global visual and textual features (after average pooling) provides the visual backbone model 22 with a holistic sense of what objects 32A-32C are in the image 32. However, the visual backbone model 22 may not correspond to each instance with its spatial location, limiting effectiveness when transferred to localization-sensitive downstream tasks, such as object detection and/or instance segmentation.

Figure 4:
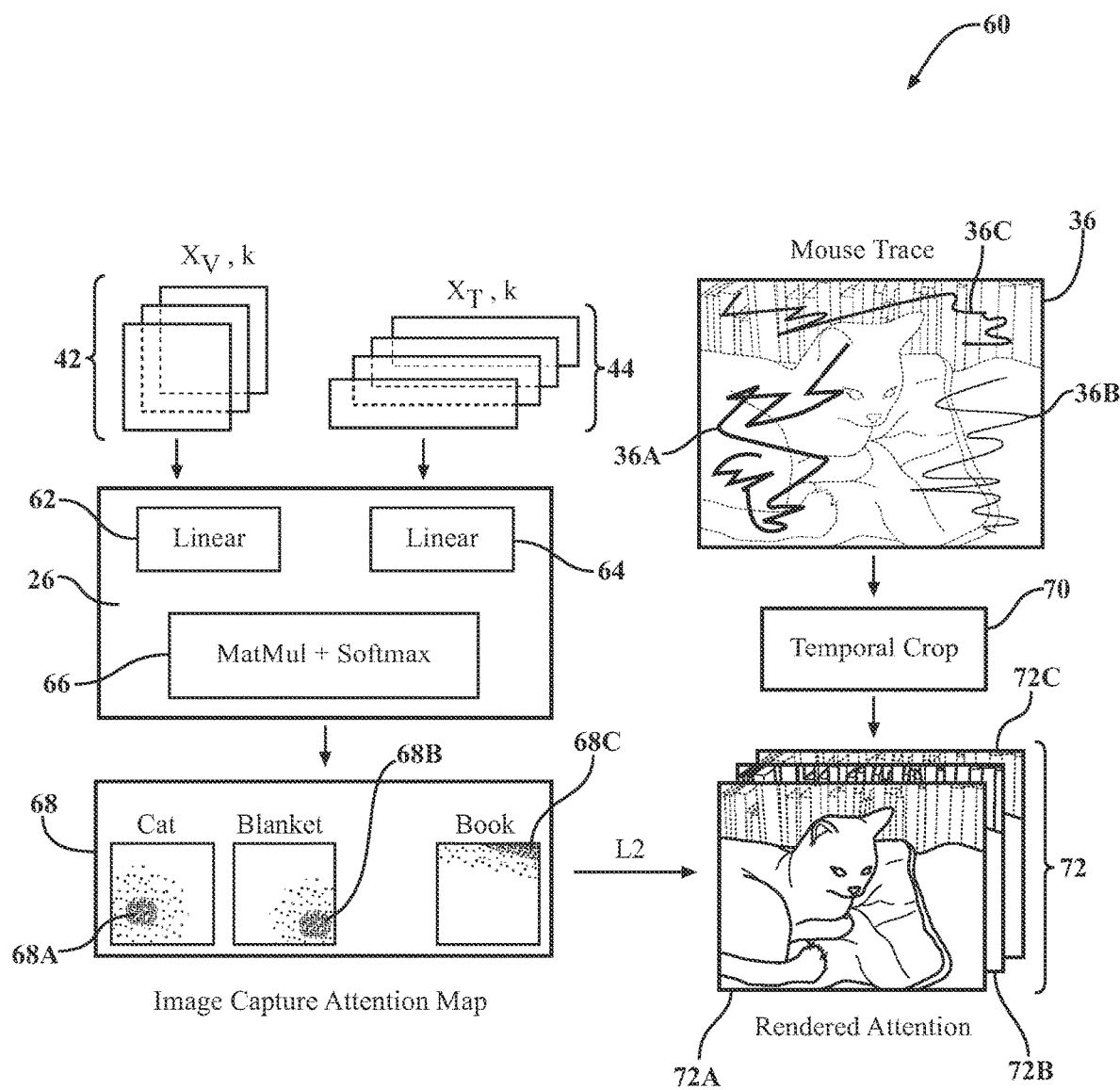
FIG. 4 is a flowchart illustrating the determination of a localized loss using a supervised loss function that compares an image-caption attention map with visual identifiers performed by the system for training the model.

As such, the training module 16 may include instructions that cause the processor(s) 12 to determine a localization loss using a supervised loss function that compares an image-caption attention map with the visual identifiers 36. Referring to FIG. 4, illustrated is a flow chart 60 detailing how the localization loss is determined. The training module 16 may include instructions that cause the processor(s) 12 to pass the visual feature maps 42 and textual feature vectors 44 through the secondary neural network 26. Moreover, the secondary neural network 26 transforms the visual feature maps 42 and textual feature vectors 44 linearly using a 1024-dimension fully connected layers 62 and 64, respectively. A global average pooling may not be applied to keep the spatial dimension to learn localization. Thus, the transformed visual feature maps 42 $z_{v,k}$ will have a size of 1024×R×R. The transformed textual feature vectors 44 $z_{v,k}$ will have a size of 1024×L.

The training module 16 may include instructions that cause the processor(s) 12 to utilize layer 66 to compute the image-caption attention map 68 as the normalized product between the transformed visual feature maps 42 $z_{v,k}$ and the transformed textual feature vectors 44 $z_{v,k}$. This computation may be represented in the following equation:

$$M_k = \text{softmax}(z_{T,k}^T \times z_{v,k}) \quad (2)$$

which will then have the size of L×R×R. In Mk, each location (i, x, y) corresponds to the probability of whether the object described by the token i is located in the region of (x, y). The image-caption attention map 68 may be able to identify a location 68A within the image 32 that relates to the location of the cat 32A, a location 68B within the image 32 that relates to the location of the blanket 32B, and a location 68C within the image 32 that relates to the location of the books 32C.

Given that the visual identifiers 36A-36C may correspond to the locations of the objects 32A-32C within the image 32 and are synchronized with the tokens 34A-34C of the caption 34, the visual identifiers 36A-36C can be utilized to supervise the generation of the image-caption attention map 68. As such, the localization loss is generated using a loss function that compares the image-caption attention map 68 with the visual identifiers 36. The training module 16 may include instructions that cause the processor(s) 12 to then adjust the model weights 23, 25, and/or 27 of the visual backbone model 22, the textual backbone model 24, and the secondary neural network 26 based on the localization loss.

To determine the localization loss, the training module 16 may include instructions that cause the processor(s) 12 to temporally crop portions of the visual identifiers 36 to using a cropping function 70 to generate cropped visual identifiers that correspond to the words of the caption associated with each of the objects of the image 32. Next, the training module 16 may include instructions that cause the processor(s) 12 to render covered regions of the image 32 associated with the cropped visual identifiers to generate binary masks with a resolution R.

Thereafter, the training module 16 may include instructions that cause the processor(s) 12 to stack the rendered masks of all tokens together to generate a rendered attention 72 ($\hat{\mathcal{M}}_k$). The rendered attention 72 may include render attentions 72A, 72B, and 72C for each of the detected objects in the image 32. Since rendered attention 72 ($\hat{\mathcal{M}}_k$) has the same format and definition as the image-caption attention map 68 ($\mathcal{M}_k$), the training module 16 may include instructions that cause the processor(s) 12 to use rendered attention 72 ($\hat{\mathcal{M}}_k$) to provide supervision on the image-caption attention map 68 ($\mathcal{M}_k$) with a normalized regression loss. As such, the localization loss may be expressed as:

$$L_L = \sum_{k=1}^{n} \left| \mathcal{M}_k/|\mathcal{M}_k|_2 - \hat{\mathcal{M}}_k/|\hat{\mathcal{M}}_k|_2 \right|_2 \quad (3)$$

Once the normalized regression loss is determined, as explained previously, the training module 16 may include instructions that cause the processor(s) 12 to then adjust the model weights 23, 25, and 27 of the visual backbone model 22, the textual backbone model 24, and the secondary neural network 26, respectively, based on the localization loss.

If the visual feature maps from the visual backbone model 22 have a low resolution, the localization loss may be applied to the second last visual feature maps (which may be twice the resolution) to provide supervision at a finer scale. The losses computed at different resolutions may then be added together with equal weights.

Figure 5:
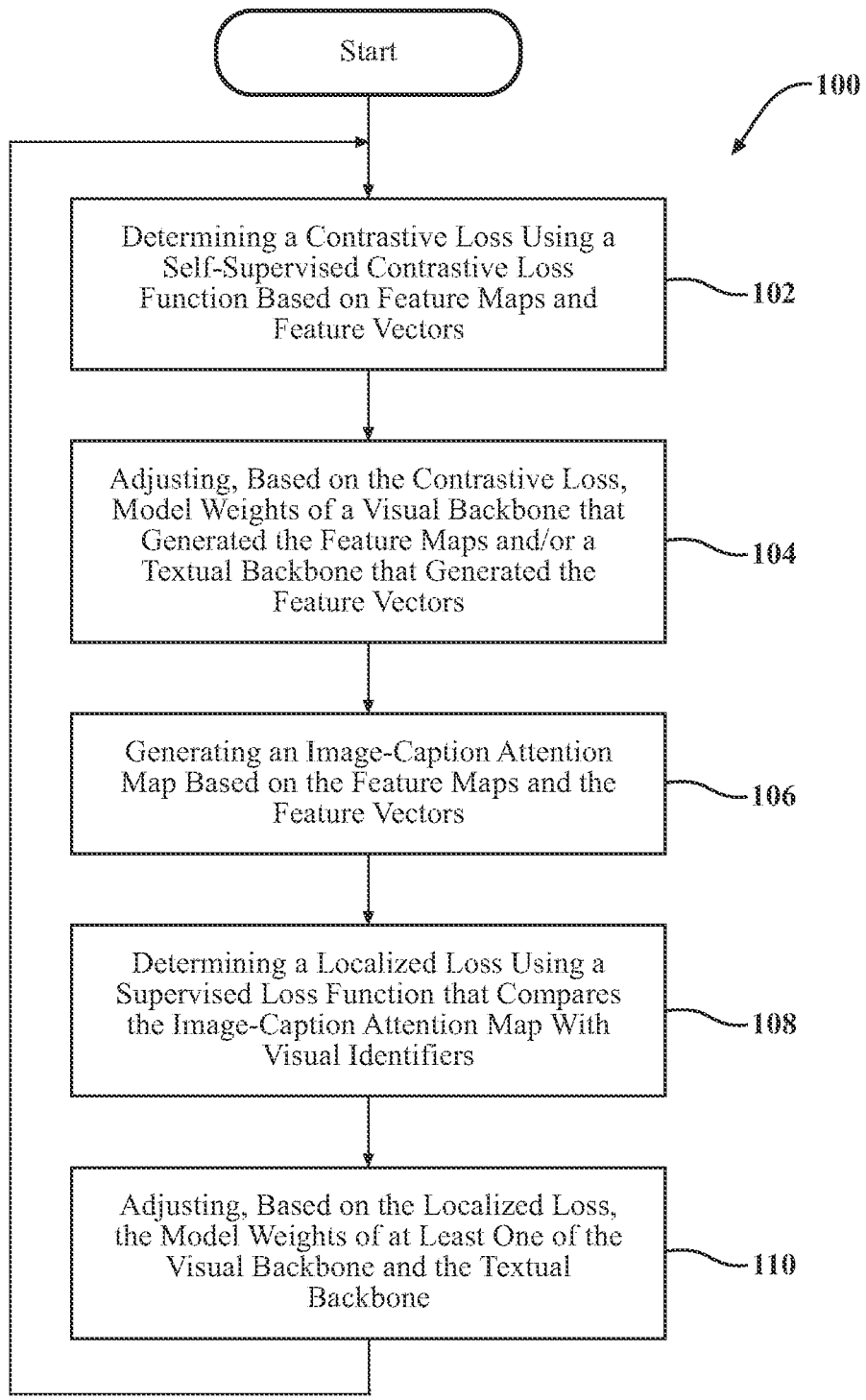
FIG. 5 illustrates a method for training a model, such as a visual backbone model and/or a textual backbone model.

Referring to FIG. 5, a method 100 for training a model is shown. The method 100 will be described from the viewpoint of the model training system 10 of FIG. 1, with support from the flowcharts of FIGS. 2-4. However, it should be understood that this is just one example of implementing the method 100. While method 100 is discussed in combination with the model training system 10, it should be appreciated that the method 100 is not limited to being implemented within the model training system 10, but is instead one example of a system that may implement the method 100. Further, it should be understood that when describing the method 100, actions performed by the model training system 10 previously described in the paragraphs above are equally applicable to the method 100 and may not be described again, as the previous description is suitable.

In step 102, the training module 16 may include instructions that cause the processor(s) 12 to determine a contrastive loss using a self-supervised contrastive loss function based on visual feature maps 42 and the textual feature vectors 44. As explained previously, this can be accomplished by using a self-supervised contrastive loss function based on the visual feature maps 42 describing the visual content of the image 32 and the textual feature vectors 44 describing the meaning of words of the caption 34 about objects 32A-32C within the image 32. Essentially, the training module 16 may cause the processor(s) 12 to encourage the visual backbone model 22 and the textual backbone model 24 to not only project the visual feature maps 42 and textual feature vectors 44 of matching image-caption pairs to be closer, but also the features of non-matching pairs to be further.

In step 104, the training module 16 may include instructions that cause the processor(s) 12 to adjust, based on the contrastive loss, the model weights 23 and/or 25 of the visual backbone model 22 and/or the textual backbone model 24, respectively.

In step 106, the training module 16 may include instructions that cause the processor(s) 12 to generate the image-caption attention map 68 based on the visual feature maps 42 and the textual feature vectors 44. The image-caption attention map 68 may identify locations and object types of the objects 32A-32C within the image 32.

Figure 6:
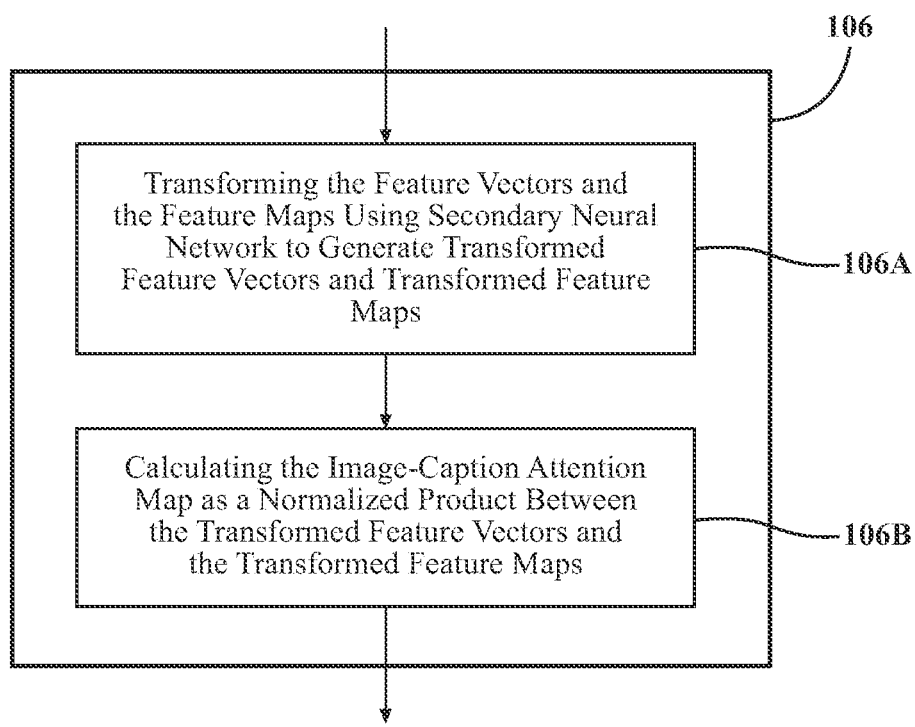
FIG. 6 illustrates a method for calculating an image-caption attention map.

As to the generation of the image-caption attention map 68, reference is made to FIG. 6. In step 106A of FIG. 6, the training module 16 may include instructions that cause the processor(s) 12 to transform each of the feature maps 42A and 42B and the feature vectors 44A and 44B with a global average pooling and a single 1024-dimension fully-connected layer. In step 106B, the training module 16 may include instructions that cause the processor(s) 12 to utilize layer 66 to compute the image-caption attention map 68 as the normalized product between the transformed visual feature maps 42 and the transformed textual feature vectors 44.

Figure 7:
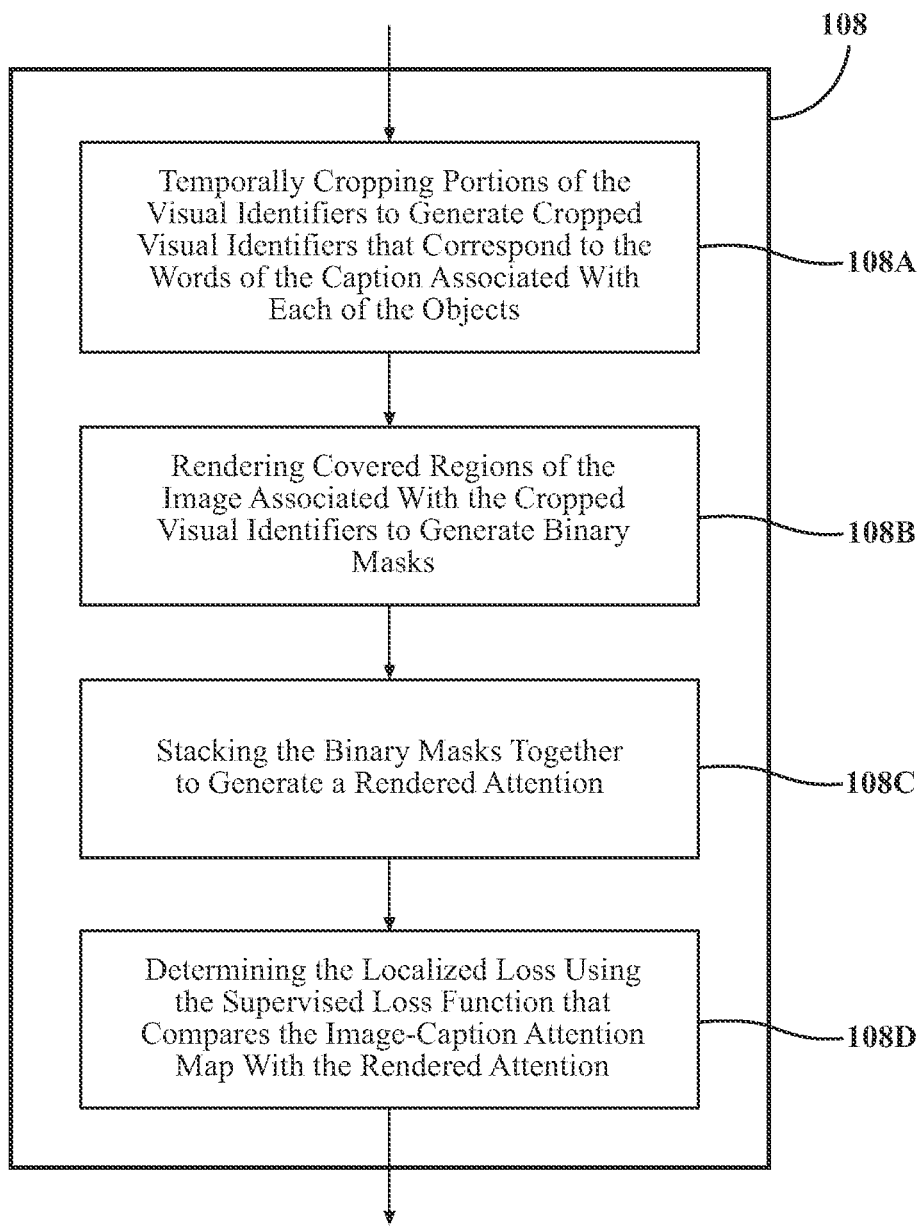
FIG. 7 illustrates a method for determining a localized loss using a supervised loss function that compares the image-caption attention map with visual identifiers.

Returning to FIG. 5, in step 108, the training module 16 may include instructions that cause the processor(s) 12 to calculate the localization loss using a loss function that compares the image-caption attention map 68 with the visual identifiers 36. For example, referring to FIG. 7, in step 108A, the training module 16 may include instructions that cause the processor(s) 12 to temporally crop portions of the visual identifiers 36 to using a cropping function 70 to generate cropped visual identifiers that correspond to the words of the caption associated with each of the objects of the image 32.

In step 108B, the training module 16 may include instructions that cause the processor(s) 12 to render covered regions of the image 320 associated with the cropped visual identifiers to generate binary masks with a resolution R. In step 108C, the training module 16 may include instructions that cause the processor(s) 12 to stack the rendered masks of all tokens together to generate a rendered attention 72. Finally, in step 108D, the training module 16 may include instructions that cause the processor(s) 12 to use the rendered attention 72 to provide supervision on the image-caption attention map 68 with a normalized regression loss.

Returning to FIG. 5, in step 110, the training module 16 may include instructions that cause the processor(s) 12 to then adjust the model weights 23, 25, and/or 27 of the visual backbone model 22, the textual backbone model 24, and the secondary neural network 26 based on the localization loss. After performing step 110, the method 100 may either end or continue again if more training data is available.

As such, the model training system 10 and the related method 100 can pre-train a model, such as the visual backbone model 22, textual backbone model 24, and/or the secondary neural network 26 using low-cost localized textual annotations to reduce the annotation effort. The model training system 10 and the related method 100 essentially bridge the vision and language modalities with contrastive learning and supervise the cross-modal attention map with rendered mouse traces, providing coarse localization information that improves the performance of localization-sensitive downstream tasks.

The pre-training of the models, for example, the visual backbone model 22, allow features to be transferred to other downstream tasks by fine-tuning on a target data set. The type of downstream task performed by the models that have been trained by the model training system 10 and/or the related method 100 can vary from application to application. For example, the visual backbone model 22 can be utilized to perform object detection, object classification, instance segmentation, and other types of computer-related tasks. Again, the model pre-trained by the model training system 10 and/or the related method 100 can be used in a number of different applications and not necessarily those specifically listed above.

One such application relates to object detection, especially object detection performed by one or more systems of a vehicle. Again, the application of any of the models pre-trained using the model training system 10 and/or the related method 100 are numerous and are not just limited to vehicles. It should be understood that incorporating a model trained by the model training system 10 and/or the related method 100 is not limited to vehicles.

Figure 8:
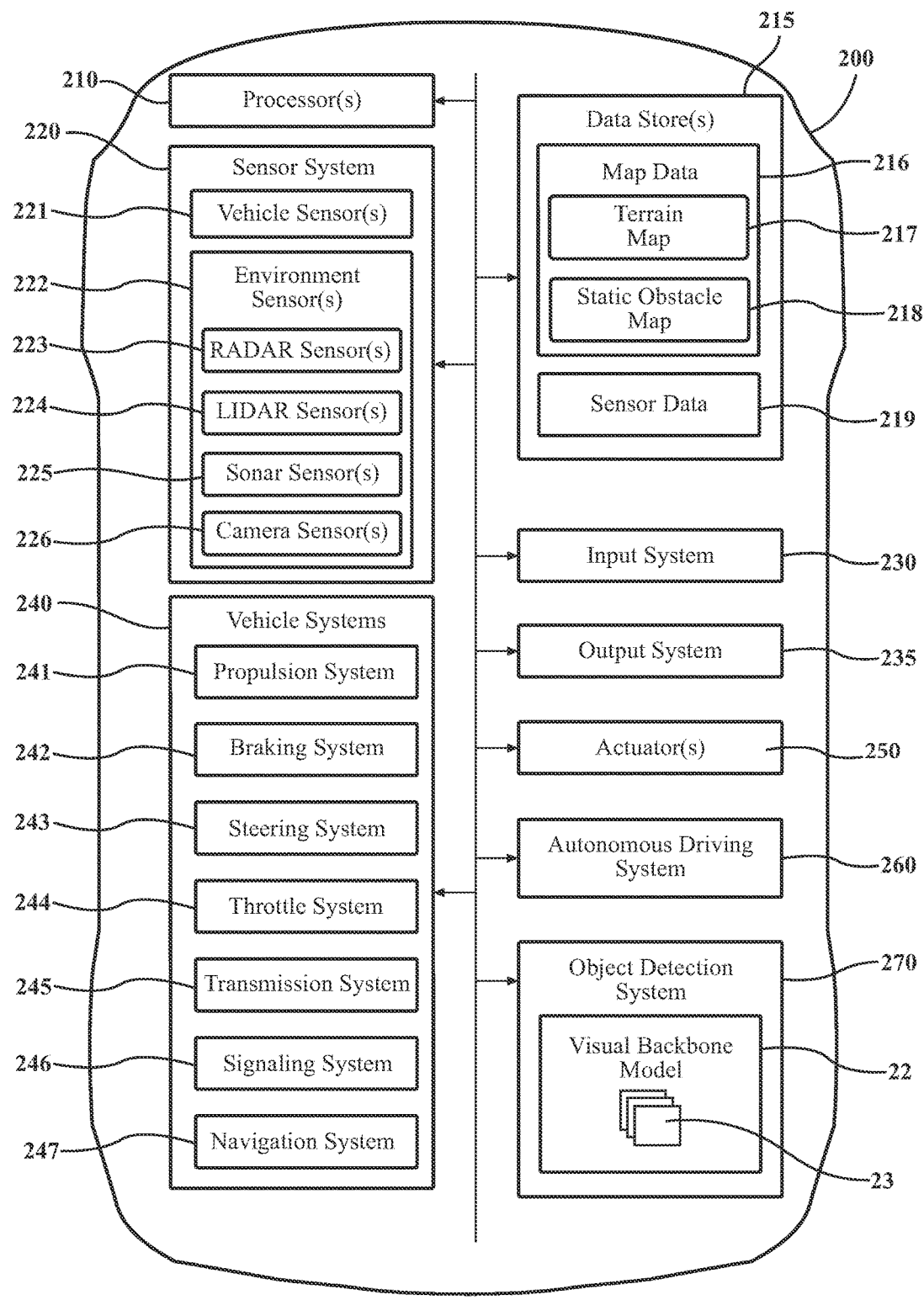
FIG. 8 illustrates a vehicle with an object detection system that utilizes a visual backbone that was pre-trained using the system of FIG. 1 and/or the method of FIG. 5.

Referring to FIG. 8, an example of a vehicle 200 is illustrated using one or more models pre-trained using the model training system 10 and/or the related method 100. As used herein, a "vehicle" is any form of powered transport. In one or more implementations, the vehicle 200 is an automobile. While arrangements will be described herein with respect to automobiles, it will be understood that embodiments are not limited to automobiles. In some implementations, the vehicle 200 may be any robotic device or form of powered transport that, for example, includes one or more automated or autonomous systems, and thus benefits from the functionality discussed herein.

The vehicle 200 also includes various elements. It will be understood that in various embodiments, it may not be necessary for the vehicle 200 to have all of the elements shown in FIG. 8. In some arrangements, the vehicle 200 may be implemented without one or more of the elements shown in FIG. 8. While the various elements are shown as being located within the vehicle 200 in FIG. 8, it will be understood that one or more of these elements can be located external to the vehicle 200. Further, the elements shown may be physically separated by large distances and provided as remote services (e.g., cloud-computing services).

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to an autonomous driving system 260.

As used herein, "autonomous vehicle" refers to a vehicle that operates in an autonomous mode. "Autonomous mode" refers to navigating and/or maneuvering the vehicle 200 along a travel route using one or more computing systems to control the vehicle 200 with minimal or no input from a human driver. In one or more embodiments, the vehicle 200 is highly automated or completely automated. In one embodiment, the vehicle 200 is configured with one or more semi-autonomous operational modes in which one or more computing systems perform a portion of the navigation and/or maneuvering of the vehicle 200 along a travel route, and a vehicle operator (i.e., driver) provides inputs to the vehicle to perform a portion of the navigation and/or maneuvering of the vehicle 200 along a travel route. Such semi-autonomous operations can include supervisory control.

The vehicle 200 can include one or more processor(s) 210. In one or more arrangements, the processor(s) 210 can be a main processor of the vehicle 200. For instance, the processor(s) 210 can be an electronic control unit (ECU). The vehicle 200 can include one or more data store(s) 215 for storing one or more types of data. The data store(s) 215 can include volatile and/or non-volatile memory. Examples of data store(s) 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 215 can be a component of the processor(s) 210, or the data store(s) 215 can be operatively connected to the processor(s) 210 for use thereby. The term "operatively connected" and/or "in communication with," as used throughout this description, can include direct or indirect connections, including connections without direct physical contact.

In one or more arrangements, the data store(s) 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

In one or more arrangements, the map data 216 can include one or more terrain map(s) 217. The terrain map(s) 217 can include information about the ground, terrain, roads, surfaces, and/or other features of one or more geographic areas. The terrain map(s) 217 can include elevation data in the one or more geographic areas. The map data 216 can be high quality and/or highly detailed. The terrain map(s) 217 can define one or more ground surfaces, which can include paved roads, unpaved roads, land, and other things that define a ground surface.

In one or more arrangements, the map data 216 can include one or more static obstacle map(s) 218. The static obstacle map(s) 218 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 218 can have location data, size data, dimension data, material data, and/or other data associated with it. The static obstacle map(s) 218 can include measurements, dimensions, distances, and/or information for one or more static obstacles. The static obstacle map(s) 218 can be high quality and/or highly detailed. The static obstacle map(s) 218 can be updated to reflect changes within a mapped area.

The one or more data store(s) 215 can include sensor data 219. In this context, "sensor data" means any information about the sensors that the vehicle 200 is equipped with, including the capabilities and other information about such sensors. As will be explained below, the vehicle 200 can include the sensor system 220. The sensor data 219 can relate to one or more sensors of the sensor system 220.

In some instances, at least a portion of the map data 216 and/or the sensor data 219 can be located in one or more data store(s) 215 located onboard the vehicle 200. Alternatively, or in addition, at least a portion of the map data 216 and/or the sensor data 219 can be located in one or more data store(s) 215 that are located remotely from the vehicle 200.

As noted above, the vehicle 200 can include the sensor system 220. The sensor system 220 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the vehicle 200 (including any of the elements shown in FIG. 8). The sensor system 220 can acquire data of at least a portion of the external environment of the vehicle 200 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensor(s) 221. The vehicle sensor(s) 221 can detect, determine, and/or sense information about the vehicle 200 itself. In one or more arrangements, the vehicle sensor(s) 221 can be configured to detect, and/or sense position and orientation changes of the vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 200. In one or more arrangements, the vehicle sensor(s) 221 can include a speedometer to determine a current speed of the vehicle 200.

Alternatively, or in addition, the sensor system 220 can include one or more environment sensors 222 configured to acquire, and/or sense driving environment data. "Driving environment data" includes data or information about the external environment in which an autonomous vehicle is located or one or more portions thereof. For example, the one or more environment sensors 222 can be configured to detect, quantify and/or sense obstacles in at least a portion of the external environment of the vehicle 200 and/or information/data about such obstacles. Such obstacles may be stationary objects and/or dynamic objects. The one or more environment sensors 222 can be configured to detect, measure, quantify and/or sense other things in the external environment of the vehicle 200, such as, for example, lane markers, signs, traffic lights, traffic signs, lane lines, crosswalks, curbs proximate the vehicle 200, off-road objects, etc.

Various examples of sensors of the sensor system 220 will be described herein. The example sensors may be part of the one or more environment sensors 222 and/or the one or more vehicle sensor(s) 221. However, it will be understood that the embodiments are not limited to the particular sensors described.

As an example, in one or more arrangements, the sensor system 220 can include one or more radar sensor(s) 223, one or more LIDAR sensor(s) 224, one or more sonar sensor(s) 225, and/or one or more camera(s) 226. In one or more arrangements, the one or more camera(s) 226 can be high dynamic range (HDR) cameras or infrared (IR) cameras.

The vehicle 200 can include an input system 230. An "input system" includes any device, component, system, element or arrangement, or groups that enable information/data to be entered into a machine. The input system 230 can receive an input from a vehicle passenger (e.g., a driver or a passenger). The vehicle 200 can include an output system 235. An "output system" includes any device, component, or arrangement, or groups thereof that enable information/data to be presented to a vehicle passenger (e.g., a person, a vehicle passenger, etc.).

The vehicle 200 can include one or more vehicle systems 240. Various examples of the one or more vehicle systems 240 are shown in FIG. 8. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, a throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 200 and/or to determine a travel route for the vehicle 200. The navigation system 247 can include one or more mapping applications to determine a travel route for the vehicle 200. The navigation system 247 can include a global positioning system, a local positioning system, or a geolocation system.

The vehicle 200 may include an object detection system 270 that receives information from the sensor system 220. Using information received from the sensor system 220, the object detection system 270 can detect the presence of objects using the visual backbone model 22 that has been pre-trained using the model training system 10 and/or the related method 100 as previously described. Again, it should be understood that this is just but one example of using a model trained by the model training system 10 and/or the related method 100. There are numerous other uses for the visual backbone model 22, in addition to object detection, such as semantic/instance segmentation, object detection, or any other computer vision task. Information generated by the object detection system 270 may be provided to the autonomous driving system 260, which may control the movement of the vehicle 200.

The processor(s) 210 and/or the autonomous driving system 260 can be operatively connected to communicate with the vehicle systems 240 and/or individual components thereof. The processor(s) 210 and/or the autonomous driving system 260 can be in communication to send and/or receive information from the vehicle systems 240 to control the movement, speed, maneuvering, heading, direction, etc. of the vehicle 200. As explained previously, the object detection system 270 may also be in communication with the processor(s) 210 and/or the autonomous driving system 260 to provide object detection related information. Additionally, the autonomous driving system 260 may provide autonomous operation to the vehicle 200, wherein little or no driver input is required. However, the autonomous driving system 260 may provide for a semi-autonomous operation of the vehicle 200, wherein commands from the driver are still required to pilot the vehicle 200 from one location to another.

The processor(s) 210 and/or the autonomous driving system 260 may be operable to control the navigation and/or maneuvering of the vehicle 200 by controlling one or more of the vehicle systems 240 and/or components thereof. For instance, when operating in an autonomous mode, the processor(s) 210 and/or the autonomous driving system 260 can control the direction and/or speed of the vehicle 200. The processor(s) 210 and/or the autonomous driving system 260 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 200 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving system 260. Any suitable actuator can be used. For instance, the one or more actuators 250 can include motors, pneumatic actuators, hydraulic pistons, relays, solenoids, and/or piezoelectric actuators, just to name a few possibilities.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for training a model comprising:
a processor; and
a memory in communication with the processor having a training module, the training module having instructions that, when executed by the processor, cause the processor to:
determine a contrastive loss using a self-supervised contrastive loss function based on feature maps describing a visual content of an image having objects and feature vectors describing a meaning of words of a caption describing the objects within the image,
adjust, based on the contrastive loss, model weights of at least one of a visual backbone that generated the feature maps and a textual backbone that generated the feature vectors,
determine a localized loss using a supervised loss function that compares an image-caption attention map with visual identifiers, the visual identifiers identifying locations of the objects within the image and are associated with portions of the caption describing the objects, and adjust, based on the localized loss, the model weights of at least one of the visual backbone and the textual backbone.

2. The system of claim 1, wherein the training module further includes instructions that, when executed by the processor, cause the processor to:

generate the image-caption attention map based on the feature maps and the feature vectors, the image-caption attention map identifying locations and object types of the objects within the image, and determine the localized loss by comparing the locations and object types of the objects defined by the image-caption attention map with the visual identifiers.

3. The system of claim 2, wherein the training module further includes instructions that, when executed by the processor, cause the processor to:

transform the feature vectors and the feature maps using a secondary neural network having a multi-dimensional fully-connected layer to generate transformed feature vectors and transformed feature maps, and calculate the image-caption attention map as a normalized product between the transformed feature vectors and the transformed feature maps.

4. The system of claim 3, wherein the training module further includes instructions that, when executed by the processor, cause the processor to adjust, based on the localized loss, the model weights of the secondary neural network.

5. The system of claim 2, wherein the training module further includes instructions that, when executed by the processor, cause the processor to:

temporally crop portions of the visual identifiers to generate cropped visual identifiers that correspond to the words of the caption associated with each of the objects, render covered regions of the image associated with the cropped visual identifiers to generate binary masks, stack the binary masks together to generate a rendered attention, and determine the localized loss using the supervised loss function that compares the image-caption attention map with the rendered attention.

6. The system of claim 1, wherein the visual identifiers are mouse traces indicating a location of objects with the image.

7. The system of claim 1, wherein the training module further includes instructions that, when executed by the processor, cause the processor to pull positive pairs of the feature maps and the feature vectors closer and push non-matching pairs of the feature maps and the feature vectors apart using the self-supervised contrastive loss function to determine the contrastive loss.

8. A method for training a model comprising the step of:

determining a contrastive loss using a self-supervised contrastive loss function based on feature maps describing a visual content of an image having objects and feature vectors describing a meaning of words of a caption describing the objects within the image;

adjusting, based on the contrastive loss, model weights of at least one of a visual backbone that generated the feature maps and a textual backbone that generated the feature vectors;

determining a localized loss using a supervised loss function that compares an image-caption attention map with visual identifiers, the visual identifiers identifying locations of the objects within the image and are associated with portions of the caption describing the objects; and adjusting, based on the localized loss, the model weights of at least one of the visual backbone and the textual backbone.

9. The method of claim 8, further comprising the steps of:

generating the image-caption attention map based on the feature maps and the feature vectors, the image-caption attention map identifying locations and object types of the objects within the image; and determining the localized loss by comparing the locations and object types of the objects defined by the image-caption attention map with the visual identifiers.

10. The method of claim 9, further comprising the steps of:

transforming the feature vectors and the feature maps using a secondary neural network having a multi-dimensional fully-connected layer to generate transformed feature vectors and transformed feature maps; and calculating the image-caption attention map as a normalized product between the transformed feature vectors and the transformed feature maps.

11. The method of claim 10, further comprising the step of adjusting, based on the localized loss, the model weights of the secondary neural network.

12. The method of claim 9, further comprising the steps of:

temporally cropping portions of the visual identifiers to generate cropped visual identifiers that correspond to the words of the caption associated with each of the objects;

rendering covered regions of the image associated with the cropped visual identifiers to generate binary masks;

stacking the binary masks together to generate a rendered attention; and determining the localized loss using the supervised loss function that compares the image-caption attention map with the rendered attention.

13. The method of claim 8, wherein the visual identifiers are mouse traces indicating a location of objects with the image.

14. The method of claim 8, further comprising the step of pulling positive pairs of the feature maps and the feature vectors closer and pushing non-matching pairs of the feature maps and the feature vectors apart using the self-supervised contrastive loss function to determine the contrastive loss.

15. A non-transitory computer-readable medium comprising instructions that, when executed by a processor, cause the processor to:

determine a contrastive loss using a self-supervised contrastive loss function based on feature maps describing a visual content of an image having objects and feature vectors describing a meaning of words of a caption describing the objects within the image;

adjust, based on the contrastive loss, model weights of at least one of a visual backbone that generated the feature maps and a textual backbone that generated the feature vectors;

determine a localized loss using a supervised loss function that compares an image-caption attention map with visual identifiers, the visual identifiers identifying locations of the objects within the image and are associated with portions of the caption describing the objects; and adjust, based on the localized loss, the model weights of at least one of the visual backbone and the textual backbone.

16. The non-transitory computer-readable medium of claim 15, further comprising instructions that, when executed by the processor, cause the processor to:
generate the image-caption attention map based on the feature maps and the feature vectors, the image-caption attention map identifying locations and object types of the objects within the image; and
determine the localized loss by comparing the locations and object types of the objects defined by the image-caption attention map with the visual identifiers.

17. The non-transitory computer-readable medium of claim 16, further comprising instructions that, when executed by a processor, cause the processor to:
transform the feature vectors and the feature maps using a secondary neural network having a multi-dimensional fully-connected layer to generate transformed feature vectors and transformed feature maps; and
calculate the image-caption attention map as a normalized product between the transformed feature vectors and the transformed feature maps.

18. The non-transitory computer-readable medium of claim 17, further comprising instructions that, when executed by a processor, cause the processor to adjust, based on the localized loss, the model weights of the secondary neural network.

19. The non-transitory computer-readable medium of claim 16, further comprising instructions that, when executed by a processor, cause the processor to:
temporally crop portions of the visual identifiers to generate cropped visual identifiers that correspond to the words of the caption associated with each of the objects;
render covered regions of the image associated with the cropped visual identifiers to generate binary masks;
stack the binary masks together to generate a rendered attention; and
determine the localized loss using the supervised loss function that compares the image-caption attention map with the rendered attention.

20. The non-transitory computer-readable medium of claim 15, further comprising instructions that, when executed by a processor, cause the processor to pull positive pairs of the feature maps and the feature vectors closer and push non-matching pairs of the feature maps and the feature vectors apart using the self-supervised contrastive loss function to determine the contrastive loss.

* * * * *